US006277943B1

(12) United States Patent
Sarpeshkar et al.

(10) Patent No.: US 6,277,943 B1
(45) Date of Patent: Aug. 21, 2001

(54) ONE-SHOT POLYURETHANE ELASTOMERS WITH VERY LOW COMPRESSION SET

(75) Inventors: Ashok M. Sarpeshkar, Upper St. Clair; Peter H. Markusch, McMurray, both of PA (US); Robert L. Cline, Paden City, WV (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/458,790

(22) Filed: Dec. 10, 1999

(51) Int. Cl.$^7$ .................................................. C08G 18/76
(52) U.S. Cl. ................................. 528/65; 528/67
(58) Field of Search ......................... 528/65, 67

(56) References Cited

U.S. PATENT DOCUMENTS

| | | | |
|---|---|---|---|
| 3,635,906 | 1/1972 | Jayawant | 260/77.5 AC |
| 3,644,457 | 2/1972 | König et al. | 260/453 SP |
| 3,806,486 | 4/1974 | Endriss et al. | 260/31.2 N |
| 4,115,429 | 9/1978 | Reiff et al. | 260/453 SP |
| 4,118,411 | 10/1978 | Reiff et al. | 260/453 SP |
| 4,256,849 * | 3/1981 | Ick et al. | 521/129 |
| 4,401,804 | 8/1983 | Wooten et al. | 528/272 |
| 4,447,590 | 5/1984 | Szycher | 528/76 |
| 4,523,005 | 6/1985 | Szycher | 528/76 |
| 4,551,498 | 11/1985 | Yeater et al. | 524/424 |
| 4,618,667 | 10/1986 | Kay et al. | 529/49 |
| 4,621,113 | 11/1986 | Collins | 524/196 |
| 5,059,672 | 10/1991 | Engebretson | 528/64 |
| 5,208,315 | 5/1993 | Seneker | 528/67 |
| 5,350,889 | 9/1994 | Steppan et al. | 521/159 |
| 5,563,232 | 10/1996 | Hurley et al. | 528/60 |
| 5,585,452 | 12/1996 | Hurley et al. | 528/67 |
| 5,719,229 | 2/1998 | Pantone et al. | 524/706 |

FOREIGN PATENT DOCUMENTS

| | | |
|---|---|---|
| 971184 | 7/1975 | (CA) . |
| 1196864 | 7/1965 | (DE) . |

* cited by examiner

*Primary Examiner*—Rachel Gorr
(74) *Attorney, Agent, or Firm*—Joseph C. Gil; N. Denise Brown

(57) ABSTRACT

The present invention relates to a process for the production of one-shot polyurethane elastomers having low compression sets. This process comprises reacting a polymethylene poly(phenylisocyanate) having an average functionality of 2.2 to 2.8, and a polyol component that has an average functionality of 2.0 or less. The polyol component comprises at least one relatively high molecular weight isocyanate-reactive component, and at least one relatively low molecular weight isocyanate-reactive component, with the functionalities and quantities of each component being such that the above average functionality of 2.0 or less for the polyol component is satisfied. Polyurethane elastomers produced by the process of this invention are characterized by compression sets of less than 10%.

30 Claims, No Drawings

ONE-SHOT POLYURETHANE ELASTOMERS WITH VERY LOW COMPRESSION SET

BACKGROUND OF THE INVENTION

This invention relates to a process for the production of one-shot polyurethane elastomers having low compression sets. This process comprises reacting a polymethylene poly (phenylisocyanate) having an average functionality of 2.2 to 2.8 and a 2,4'-methylene bis(phenyl isocyanate) content of at least 10% by weight, and a polyol component that has an average functionality of 2.0 or less. The polyol component comprises at least one relatively high molecular weight isocyanate-reactive component, and at least one relatively low molecular weight isocyanate-reactive component. Polyurethane elastomers produced by the process of this invention are characterized by compression sets of less than 15%, preferably 12% or less, and most preferably of 10% or less.

Liquid room temperature stable polyisocyanates based on 2,4'- and 4,4'-diphenylmethane diisocyanates containing varying amounts of the 2,4'-isomer are known and described in, for example, U.S. Pat. Nos. 4,118,411, 5,350,778, 5,563,232 and 5,585,452. These liquid polyisocyanates are capable of reacting with a suitable polyol component to form molded polyurethane products via the one-shot process.

The process of molded articles having a closed surface layer by the isocyanate poly addition process is known. Such articles may be made, for example, by introducing a reactive (optionally, foamable) mixture based on compounds containing several reactive hydrogen atoms and polyisocyanates into a mold (see, e.g., German Auslegeshcrift No. 1,196,864). The compounds with reactive hydrogen atoms typically used are polyethers containing hydroxyl groups. Examples of suitable polyisocyanates include 2,4- and 2,6-toluene diisocyanate, their isomeric mixtures and polyphenyl polymethylene polyisocyanates obtained by aniline-formaldehyde condensation followed by phosgenation. Water and/or fluorinated hydrocarbons may be used as blowing agents. Catalysts known to those in the art to be useful for the production of polyurethanes are generally also used.

Depending upon the starting components (and chain lengthening agents such as glycols or diamines if used), it is possible to obtain both elastic and rigid products and variations between these extremes by this procedure. For molded articles that must withstand heavy wear, it is customary to use slightly branched raw materials because such materials yield a product having elastomer-like characteristics. Molded articles of this kind have been produced on a technical scale (e.g., as shoe soles in the shoe manufacturing industry, bowling balls, encapsulation for transformers, self-leveling compositions for gyms, resins for the manufacturing of air bag sensors, cross over pads, etc.).

U.S. Pat. No. 4,774,263 describes a one-shot process for the production of elastic molded articles having a closed surface layer by the reaction injection molding technique without using an external mold release agent. The reaction mixture used in the '263 patent comprises a di- and/or polyisocyanate in which all of the isocyanate groups are aromatically bound, a polyether, a diamine, and optionally, auxiliary agents and additives.

U.S. Pat. No. 5,719,229 describes polyurethane elastomers having reduced surface skinning and improved green strength prepared by reaction of polyester-based isocyanate prepolymers with diol chain extenders in the presence of certain surface skinning retardants. Various approaches to eliminate surface skinning and improve green strength have been reported. E.g., U.S. Pat. Nos. 3,806,486, 3,635,906, 4,401,804, 4,551,498, and 4,618,667.

U.S. Pat. No. 5,059,672 describes elastomeric reaction products of an aromatic isocyanate, an aliphatic isocyanate having a functionality of at least two, and an aromatic diamine. Suitable aromatic isocyanates include aromatic isocyanates, aromatic isocyanate terminated aliphatics, aromatic isocyanate terminated cycloaliphatics, aromatic isocyanate terminated quasi-prepolymers, and aromatic isocyanate terminated prepolymers. Suitable aliphatic isocyanates include isocyanate terminated aliphatics, cycloaliphatic isocyanates containing at least two isocyanate groups, isocyanate terminated quasi-prepolymers and isocyanate terminated prepolymers. Chain extenders, fillers, pigments, etc., may also be included.

Various polyurethanes and elastomers which may be prepared from an isocyanate, a chain extender and optionally a polyol, in the presence of various catalysts are known and described in, for example, U.S. Pat. Nos. 4,447,590, 4,523,005, 4,621,113 and 5,208,315, and Canadian Patent 971,184. The catalysts described in these references are standard polyurethane catalysts such as, for example, dibutyl tin dilaurate or dibutyl tin oxide.

U.S. Pat. No. 4,115,429 describes low temperature, stable liquid diphenylmethane diisocyanates which are useful isocyanate components in the manufacturing of one-shot polyurethane elastomers. Also see U.S. Pat. No. 3,644,457 in this regard.

Low compression set polyurethane elastomers are specifically useful in gasket applications and other applications where dynamic mechanical properties are required, i.e. shock absorbers. Very low compression set polyurethanes can usually only be contained by the so called "hot cast elastomer process" where isocyanate prepolymers based on MDI with very low NCO content (usually less than 10%) are reacted at elevated temperatures (i.e., 80° C.) with a chain extender (i.e., 1,4-butanediol). The hot cast elastomer process does not only require high temperatures but is also expensive and demands equipment with very high accuracy to mix the components due to mix ratios ranging from 90:10 to even 95:5. The one-shot process on the other hand, can be performed at ambient temperatures and allows more robust mix ratios of about 1:1 to about 1:3. However, polyurethane made by the one-shot process as known by the art have not shown the desirable low compression set.

SUMMARY OF THE INVENTION

This invention relates to a process for the production of one-shot polyurethane elastomers having low compression sets. This process comprises reacting a polymethylene poly (phenylisocyanate) or a prepolymer thereof, having an average functionality of 2.2 to 2.8 and a 2,4'-methylene bis (phenyl isocyanate) content of at least about 10%, preferably from about 10% to about 40% by weight, based on the total weight of polyisocyanate; and a polyol component that has an average functionality of about 2.0 or less; wherein the components are processed via the one-shot process at an isocyanate index of 90 to 130, preferably about 100 to 110. Polyurethane elastomers produced by the process of this invention are characterized by compression sets of less than 20%, preferably about 15% or less, more preferably about 12% or less, and most preferably about 10% or less.

Suitable polymethylene poly(phenylisocyanate) components and prepolymers of polymethylene poly (phenylisocyanates) have an NCO group content of 15 to 33%, preferably 20 to 33%, an average functionality of 2.2 to 2.8 (preferably 2.3 to 2.8), and contain at least about 10%, preferably from about 10% to about 40% by weight, based on the total weight of polyisocyanate, of 2,4'-methylene bis(phenyl isocyanate). Preferably, the polymethylene poly (phenylisocyanate) component and prepolymers of polymethylene poly(phenylisocyanate) have a functionality of 2.3 to 2.8, and contains from about 10 to about 30% by weight of 2,4'-methylene bis(phenyl isocyanate).

Suitable polyol components of the present invention have an average functionality of 2.0 or less, preferably 1.5 to 2.0, and comprise 1) from 60 to 95% by weight, based on 100% by weight of component B), of at least one isocyanate-reactive component containing hydroxyl groups, and having a molecular weight of more than 2,000 (preferably of from 3,000 to 8,000) and an average functionality of about 1.5 to about 2 (preferably about 2), and 2) from 5 to 40% by weight, based on 100% by weight of component B), of at least one isocyanate-reactive component having a molecular weight of about 62 to 1,000 (preferably about 90 to 300) and a functionality of about 1.5 to 2 (preferably about 2).

DETAILED DESCRIPTION OF THE INVENTION

Suitable polymethylene poly(phenylisocyanates) and prepolymers of polymethylene poly(phenylisocyanates) to be used as component A) in the present invention include those having an NCO group content of 15 to 33% (preferably 20 to 33%), an average functionality of 2.2 to 2.8, preferably of 2.3 to 2.8, and contain at least about 10%, preferably from about 10% to about 40% by weight, and most preferably from about 10% to about 30% by weight, based on the total weight of polyisocyanate, of 2,4'-methylene bis (phenylisocyanate).

Polymethylene poly(phenylisocyanate) or polymeric MDI as used herein, refers to the three-ring and/or higher ring products derived by the phosgenation of aniline-formaldehyde condensation products.

Suitable polyisocyanates to be used as component A) in the present invention include those polymethylene poly (phenylisocyanate) compositions having an average functionality of about 2.2 to about 2.8, preferably of about 2.3 to about 2.8, and an NCO group content of about 15 to 33% by weight. These typically have a monomer content of from about 40 to about 80% by weight, with the balance being polymeric MDI, i.e., higher homologues of the MDI series. The polymethylene poly(phenylisocyanate) comprises (i) no more than 4% by weight of the 2,2'-isomer, (ii) from about 10 to about 40% by weight of the 2,4'-isomer (preferably from about 10 to about 30% by weight of the 2,4'-isomer), and (iii) from about 30 to about 70% by weight of the 4,4'-isomer, based on the entire weight of the polyisocyanate, and (iv) at least about 20% by weight to about 60% by weight of polymeric MDI, based on the total weight of the polyisocyanate, wherein the sum of (i), (ii), (iii) and (iv) totals 100% by weight of the polyisocyanate.

A preferred polymethylene poly(phenylisocyanate) composition has a functionality of from 2.3 to 2.8, an NCO group content of from about 20 to about 33% by weight, and a monomer content of from about 40 to about 70% by weight, based on the total weight of polyisocyanate composition, wherein the polymethylene poly(phenylisocyanate) comprises (i) no more than about 4% by weight of the 2,2'-isomer, (ii) from about 10 to about 30% by weight of the 2,4'-isomer, and (iii) from about 30 to about 70% by weight of the 4,4'-isomer, based on the entire weight of the polyisocyanate composition, and (iv) at least about 30% to about 60% by weight of polymeric MDI, based on the total weight of the polyisocyanate, wherein the sum of (i), (ii), (iii) and (iv) totals 100% by weight of the polyisocyanate.

Most preferred polyisocyanates include, for example, polymethylene poly(phenylisocyanate) compositions having an average functionality of from about 2.4 to about 2.7, an NCO group content of about 25 to 33% by weight, and a monomer content of from about 40 to about 70% by weight, wherein the polymethylene poly(phenylisocyanate) comprises (i) no more than about 2% by weight of the 2,2'-isomer, (ii) from about 15 to about 25% by weight of the 2,4'-isomer, and (iii) from about 35 to about 75% by weight of the 4,4'-isomer, based on the entire weight of the isocyanate composition. This isocyanate composition additionally comprises (iv) from about 40 to about 60% by weight of polymeric MDI. The sum of (i), (ii), (iii) and (iv) totals 100% by weight of the polyisocyanate.

Suitable polyisocyanates to be used as component A) of the present invention include those polymethylene poly (phenylisocyanate) compositions and mixtures thereof, having a NCO group content of about 20 to about 33% by weight, and having a viscosity of less than about 5,000 mPa·s at 25° C. The polyisocyanates of the present invention have an average functionality of from about 2.2 to about 2.8, preferably 2.3 to 2.8.

Suitable polyisocyanates for component A) of the present invention also include, for example, mixtures of polyisocyanate compositions as described above with adducts of MDI including, for example, allophanates of MDI as described in, for example, U.S. Pat. Nos. 5,319,053, 5,319,054 and 5,440, 003, the disclosures of which are herein incorporated by reference, and carbodiimides of MDI as described in, for example, U.S. Pat. Nos. 2,853,473, 2,941,966, 3,152,162, 4,088,665, 4,294,719 and 4,244,855, the disclosures of which are herein incorporated by reference.

Other suitable polyisocyanate compounds to be used as component A) in the present invention include, for example, the reaction products of MDI with glycols or polyols, which are commonly referred to as polyisocyanate prepolymers. These prepolymers preferably have an NCO group content of 15 to 30%. The MDI used to prepare the prepolymers may be, for example, pure 4,4'-MDI, a mixture of 2,4'- and 4,4'-MDI, or mixtures thereof with polymethylene poly (phenyl isocyanates). The prepolymers prepared from monomeric MDI and glycols or polyols are subsequently mixed with polymethylene poly(phenylisocyanate) having a functionality of 2.2 to 2.8 and an NCO group content of 15 to 33%. The preferred and most preferred polymethylene poly(phenylisocyanates) described hereinabove are also suitable polyisocyanate components to be used in preparing prepolymers for component A) in the present invention. Suitable glycols include, for example, ethylene glycol, 1,2- and 1,3-propylene glycol, 1,3-, 1,4- and 2,3-butylene glycol, diethylene glycol, dipropylene glycol, etc. Polyisocyanate prepolymers comprising the reaction product of propylene glycol, dipropylene glycol and tripropylene glycol are particularly preferred.

Component B) the polyol component of the present invention has an average functionality of 2.0 or less, preferably 1.5 to 2.0. This component comprises 1) from 60 to 95% by weight, preferably 70 to 90% by weight, and more preferably 80 to 90% by weight, based on 100% by weight of component B), of at least one isocyanate-reactive component containing hydroxyl groups, having a molecular weight of more than about 1,000, preferably of from about 2,000 to about 8,000, more preferably from about 2,000 to about 4,000, and having a hydroxyl functionality of about 1.5 to about 2, and preferably about 2.

Examples of suitable compounds to be used as component B)1) include the polyethers, polythioethers, and polyacetals containing from about 1.5 to about 2 isocyanate-reactive groups of the type known for the production of polyurethanes.

The high molecular weight polyethers suitable for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to components containing reactive hydrogen atoms such as water, alcohols or amines. Suitable initiator compounds which can be alkoxylated to form the isocyanate-reactive compounds to be used as component B)1) in the present invention include, for example, the low molecular weight chain extenders set forth hereinafter as component B)2), ethylene glycol, propylene glycol, diethylene glycol, dipropylene glycol, butyl carbitol, butanediol, pentanediol, bisphenol A, neopentyl glycol, trimethyl pentanediol, cyclohexane dimethanol, etc. Mixtures of suitable initiator compounds can also be used provided that the functionality of the resultant polyol mixture does not exceed 2.0. It is preferred to use polyethers which contain substantial amounts of primary hydroxyl groups in terminal positions (greater than 80% by weight, based on all of the terminal hydroxyl groups present in the polyether).

Polyether polyols are preferably used as component B)1) in the invention. Preferred polyethers include, for example, those compounds based on di-functional starters such as, for example, water, ethylene glycol, propylene glycol, etc. These preferred compounds include copolymers of ethylene oxide and propylene oxide with greater than 10% by weight of the oxides being ethylene oxides.

In another embodiment, the polyhydroxyl compound B)1) may additionally comprise: i) a dispersion of a polyurea and/or polyhydrazodi carbonamide in a relatively high molecular weight organic compound containing up to two hydroxyl groups, ii) a polymer polyol prepared by polymerizing an ethylenically unsaturated monomer or monomers in a relatively high molecular weight organic compound containing up to two hydroxyl groups, or iii) blends thereof. It is possible to use these types of polyols either alone, or in conjunction with the conventional polyethers described hereinabove.

These types of polyols are known, and can be characterized as hydroxyl containing compounds which contain high molecular weight polyadducts, polycondensates, or polymers in finely dispersed or dissolved form. Such polymers may be obtained by poly addition reactions (for example, reactions between polyisocyanates and aminofunctional compounds) and polycondensation reactions (for example, between formaldehyde and phenols and/or amines) in situ in the hydroxyl group containing compound. Such processes are described in, for example, German Auslegeschriften 1,168,075 and 1,260,142, the disclosures of which are herein incorporated by reference, and in German Offenlegungsschriften 2,324,134, 2,423,984, 2,512,385, 2,513,815, 2,550, 796, 2,550,797, 2,550,833, 2,550,862, 2,633,293, and 2,639, 254, the disclosures of which are herein incorporated by reference. See also U.S. Pat. Nos. 3,325,421, 4,042,537, 4,089,835, 4,293,470, 4,296,213, 4,374,209, and 4,786,706, the disclosures of which are herein incorporated by reference. Polyols of this type are commercially available from Bayer Corporation and Bayer AG. Also useful are the so-called polymer polyols obtained by polymerizing one or more ethylenically unsaturated monomers in a hydroxy group containing compound. Polyols modified by vinyl polymers, of the type formed, for example, by polymerizing styrene or acrylonitrile in the presence of polyether polyol are also suitable, as are polybutadienes containing OH groups. Such polymer polyols are described in U.S. Pat. Nos. 3,383,351, 3,304,273, 3,523,093, 3,110,685, and RE 28,715 and 29,118, and German Patent 1,152,536, the disclosures of which are herein incorporated by reference. Polymer polyols are commercially available from Bayer AG, BASF, and Lyondell.

The preferred PHD polyols include, for example, the polyurea of toluene diisocyanate and hydrazine dispersed in polyether polyol, and the preferred polymer polyols include, for example, those based on the monomers styrene and acrylonitrile.

Suitable compounds to be used as component B)2) in the present invention include, for example, isocyanate-reactive compounds having an average hydroxyl functionality of about 1.5 to about 2, preferably about 2. These isocyanate-reactive compounds have a molecular weight of about 62 to about 1,000, preferably about 90 to about 300. Some examples of suitable compounds include 2-methyl-1,3-propanediol, ethylene glycol, 1,2- and 1,3-propanediol, 1,3- and 1,4- and 2,3-butanediol, 1,6-hexanediol, 1,10-decanediol, diethylene glycol, triethylene glycol, tetraethylene glycol, dipropylene glycol, tripropylene glycol, neopentyl glycol, cyclohexanedimethanol, 2,2,4-trimethylpentane-1,3-diol, hydroquinone bis(2-hydroxyethyl)ether, resorcinol bis(2-hydroxyethyl)ether, etc., as well as mixtures thereof, and the like. It is also possible that mixtures of the above mentioned compounds with small amounts of monofunctional and/or trifunctional compounds can be used as component B)2) provided that the above functionality and molecular weight requirements are satisfied. Preferred compounds to be used as component B)2) include ethylene glycol, diethylene glycol, triethylene glycol, propylene glycol, dipropylene glycol, tripropylene glycol, 1,4-butanediol, and hexanediol.

In accordance with the present invention, components A) and B) are present in amounts such that the isocyanate index (NCO Index) of the reaction mixture is from about 90 to about 130, preferably from about 95 to about 110, and most preferably from about 100 to about 105. The term "Isocyanate Index" as used herein is defined as the equivalents of isocyanate which are reacted with 100 equivalents of isocyanate-reactive hydrogen containing materials.

In addition, various additives may also be present in the reaction as component C). In accordance with the present invention, some examples of suitable additives include, for example, catalysts, surface-active additives such as emulsifiers, and other additives known to be useful in polyurethane chemistry. Some examples of suitable catalysts include the tertiary amines, organometallic compounds, particularly organotin catalysts such as, for example, tin carboxylates and bismuth carboxylates, tin-sulfur catalysts, etc. Examples of surface-active additives include N-stearyl-N', N'-bis-(hydroxyethyl)urea, oleyl polyoxyethylene amide, stearyl diethanol amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

In addition to the catalysts and surface-active agents, other additives which may be used in the molding compositions of the present invention include flame retarding agents, plasticizers, antioxidants, UV stabilizers, adhesion promoters, dyes, fillers, viscosity depressants, and reinforcing agents such as glass in the form of fibers or flakes or carbon fibers. Suitable antioxidants include, for example, Irganox 245, and suitable UV stabilizers include, for example, Tinuvin 765. However, any of the known antioxidants and/or UV stabilizers may be used. As set forth hereinabove, specific advantages have been found in reaction mixtures containing antioxidants and/or UV stabilizers. It is preferred that a stabilizer selected from the group consisting of antioxidants, UV-stabilizers, hindered amine light stabilizers, and mixtures thereof is added to the mixture containing isocyanate-reactive components.

It is also possible to use the known internal mold release agents, such as, for example, zinc stearate, in the RIM process of the invention. This IMR is described in U.S. Pat. Nos. 4,269,945 and 4,585,803, the disclosures of which are herein incorporated by reference, and in Canadian Patent 1,180,146.

Pigments may also be added to the B-side of the reaction mixture. Usually when pigments are added, they are typically dispersed in a hydroxyl group containing compound (such as, for example, a polyether, a polyester, or a chain extender, etc.). When this is done, the weight of the hydroxyl group containing compound is considered in determining the percent by weight of components B)1) and B)2) as set forth hereinabove.

In preparing polyurethanes according to the present invention, the isocyanate and the isocyanate-reactive components, both maintained at ambient or slightly elevated temperature, are mixed until a homogeneous mixture is obtained. The mix ratio is chosen so that the most preferred index is achieved. Mixing of the two components may be achieved by employing either a two- or three-stream machine capable of metering the components accurately. The reacting mixture is poured into a suitable mold and cure completed at ambient or an elevated temperature in an oven. After the material has solidified, it may be demolded and allowed to post-cure either at ambient or elevated temperature.

Prior to mixing with the isocyanate, the isocyanate-reactive component is prepared by blending the individual components described in the invention with optional catalysts, fillers, and other suitable additives. It is preferable to degas this mixture, especially when inorganic fillers are employed.

As used herein, the term "molecular weight" refers to the number average molecular weight as determined by end-group analysis. Also, as used herein, the term "average functionality" refers to the functionality of a blend of polyisocyanates or polyols of different functionalities, averaged over the total weight of the blend.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The following components were used in the working examples:

Isocyanate A: a polymethylene poly(phenylisocyanate) having an NCO group content of about 32.8% by weight, a functionality of about 2.2 and having a total monomer content of about 78% by weight wherein about 55% is the 4,4'-isomer, about 20% is the 2,4'-isomer and about 3% is the 2,2'-isomer, and containing about 22% by weight of higher molecular weight homologues of the MDI series.

Isocyanate B: a polymethylene poly(phenylisocyanate) having an NCO group content of about 32.0% by weight, a functionality of about 2.7 and having a total monomer content of about 48% by weight, wherein about 31.8% is the 4,4'-isomer, about 14.5% is the 2,4'-isomer and about 1.7% is the 2,2'-isomer, and containing about 52% by weight of higher molecular weight homologues of the MDI series.

Isocyanate C: a polymethylene poly(phenyl isocyanate) prepolymer having an NCO group content of about 27% by weight, a functionality of about 2.3 and a monomer content of about 48.7% by weight, wherein about 32.5% is the 4,4'-isomer, about 13.6% is the 2,4'-isomer and about 2.6% is the 2,2'-isomer, and containing about 51.3% by weight of higher molecular weight homologues of the MDI series. This prepolymer comprises the reaction product of (i) 93.8 parts by weight of Isocyanate F, and (ii) 6.2 parts by weight of tripropylene glycol. The viscosity of this prepolymer is 460 mPa·s at 25° C.

Isocyanate D: a polymethylene poly(phenylisocyanate) having an NCO content of about 32.4%, a functionality of about 2.5, a viscosity of about 57 mPa·s at 25° C., and having a total monomer content of about 61% by weight, wherein about 18.0% by weight is the 2,4'-isomer of MDI, about 1.8% by weight is the 2,2'-isomer of MDI and the balance is the 4,4'-isomer of MDI. This isocyanate also contains about 39% by weight of higher molecular weight homologues of the MDI series.

Isocyanate E: a polymethylene poly(phenylisocyanate) having an NCO group content of about 32.6%, a functionality of about 2.6, a viscosity of about 50 mPa·s at 25° C., and having a total monomer content of about 57% by weight, wherein about 2.6% by weight is the 2,4'-isomer of MDI, and the balance is the 4,4'-isomer of MDI, and containing about 43% by weight of higher molecular weight homologues of the MDI series. (comparison)

Isocyanate F: a polymethylene poly(phenylisocyanate) having an NCO group content of about 32.6%, a functionality of about 2.4, a viscosity of about 41 mPa·s at 25° C., and a total monomer content of about 66%, wherein about 44% by weight is the 4,4'-isomer, about 19% by weight is the 2,4'-isomer, and about 3% by weight is the 2,2'-isomer, and containing about 34% higher molecular weight homologues of the MDI series.

Isocyanate G: an isocyanate prepolymer having an NCO group content of 23%, a functionality of 2.0, a urethane content of 4.2% and a viscosity of 400–700 mPa·s at 25° C., and comprising the reaction product of (i) 87 parts by weight of a mixture of 2,2'-, 2,4'-, and 4,4'-methylene bis(phenylisocyanate) wherein from about 35 to 55% by weight is the 4,4'-isomer, from about 45 to 65% by weight is the 2,4'-isomer and from about 0.5 to 5% by weight is the 2,2'-isomer; (ii) 12.5 parts by weight of tripropylene glycol; and (iii) 0.5 parts by weight of an epoxidized linseed oil having an epoxide equivalent weight of about 180. (comparison)

Isocyanate H: a polymethylene poly(phenylisocyanate) having an NCO group content of about 32.3%, a viscosity of about 200 mPa·s at 25° C., a functionality of about 2.8, and containing about 43.7% monomeric 4,4'-MDI, about 1.3% monomeric 2,4'- and 2,2'-MDI isomers and about 55% higher molecular weight homologues of the MDI series. (comparison)

Isocyanate I: a polymethylene poly(phenylisocyanate) comprising a mixture of (i) 50% by weight of Isocyanate H and (ii) 50% by weight of a prepolymer prepared from 87% by weight of monomeric 4,4'-methylene bis(phenyl-isocyanate) and 13% by weight of tripropylene glycol. Component (ii), the prepolymer, has an NCO group content of about 23%, a functionality of about 2, a urethane content of about 4.2% and a viscosity of 650 mPa·s at 25° C. The polymethylene poly (phenylisocyanate) obtained by blending (i) and (ii) at a 1:1 ratio has an NCO group content of about 29%, a viscosity of about 300 mPa·s at 25° C., a functionality of about 2.4 and contains about 43.6% monomeric 4,4'-MDI, 1.4% monomeric 2,4'-MDI and about 55% by weight of higher molecular weight homologues of the MDI series. (comparison)

Polyol A: a propylene glycol initiated propylene oxide/ethylene oxide (80:20% wt. ratio) polyether polyol having a functionality of 2, an OH number of 28 and a molecular weight of about 4000

Polyol B: diethylene glycol

Baylith L Paste: a mixture of a synthetic alumino-silicate and castor oil

DC 1500: 100% silica filled polydimethylsiloxane. An FDA approved antifoam agent used to prevent foaming in food and chemical processes.

Polyol Blend 1 comprised:

| | |
|---|---|
| Polyol A: | 85.25 pbw |
| Polyol B: | 12.74 pbw |
| Baylith L Paste: | 1.96 pbw |
| DC1500: | 0.05 pbw |
| Total: | 100.00 pbw |

This polyol blend was used in all the examples.

Casting Procedure:

The polyols and isocyanates were degassed at 50–60° C., then cooled to room temperature before casting. The castings were made by mixing the polyol blend and the isocyanate component at 25–30° C. for about 2–4 minutes, then cast into room temperature book-case molds (measuring 8"×16"×0.125") and button molds (measuring 7.5"×2.25"×0.5"). (One button mold was used for each sample.) The samples were left in the molds at room temperature for about 16 hours before demolding. After 1 month at room temperature, the samples were submitted for physical testing.

In all of the examples, the catalyst (Dabco T-12) level was adjusted for each casting to obtain a 4–10 minute pot life (i.e., just long enough to cast into molds).

TABLE 1

POLYMERIC MDI'S

| Isocyanate | Example 1 Isocyanate A | Example 2 Isocyanate B | Example 3 Isocyanate C | Example 4 Isocyanate D | Example 5 (Comp.) Isocyanate E |
|---|---|---|---|---|---|
| Functionality | 2.2 | 2.7, 2.8 | 2.3 | 2.4 | 2.4 |
| % Monomer | 78.6 | 48.5 | 48.7 | 60.3 | 58.6 |
| % 2,4'-Monomer | 21.2 | 14.2 | 13.6 | 16.6 | 2.3 |
| % T-12 (in polyol) | 0.043 | 0.068 | 0.043 | 0.054 | 0.35 |
| Compression Set (%) | 10.2 | 5.48 | 5.58 | 7.5 | 21.7 |
| Tensile Strength (psi) | 818 | 805 | 865 | 831 | 958 |
| 100% Modulus (psi) | 519 | 567 | 527 | 562 | 715 |
| Elongation (%) | 174 | 140 | 171 | 156 | 142 |
| Die C Tear | 100 | 84 | 100 | 90 | 106 |
| Split Tear | 24 | 25 | 35 | 26 | 22 |
| Taber Abrasion | 409 | 528 | 501 | 333 | 162 |
| Hardness (Shore A) | 77/75 | 80/74 | 80/76 | 77/75 | 81/79 |

Example 5 is a comparison example, and Examples 1–4 are representative of the present invention. Example 5 demonstrates that at a low 2,4'-isomer content of MDI (i.e. less than 10%), the compression set was higher than 20%.

TABLE 2

POLYMERIC MDI'S ENRICHED WITH 2,4'-MDI MONOMER (prepared by blending)

| | Compression Set | % 2,4'-MDI Isomer of Total Isocyanate | % Total Monomer | Functionality |
|---|---|---|---|---|
| Example 6 50:50 blend Iso F:Iso G | 7.7 | 23.6 | 57.3 | 2.2 |
| Example 7 50:50 blend Iso H:Iso G | 4.1 | 16.6 | 46.5 | 2.4 |
| Example 8 50:50 blend Iso B:Iso G | 4.9 | 21.6 | 49.4 | 2.4 |
| Example 9 50:50 blend Iso E:Iso G | 3.7 | 16.2 | 54.6 | 2.2 |
| Example 10 65:35 blend Iso E:Iso G | 5.7 | 12.0 | 55.8 | 2.3 |
| Example 11 Isocyanate I | 16.3 | 1.4 | 45.0 | 2.4 |
| Example 12 Isocanate G | 42 | 30.2 | 55 | 2.0 |

Examples 11 and 12 are comparison examples due to the low 2,4'-MDI isomer content, and the lower functionality (i.e., less than 2.2) of the isocyanate component, respectively. These two examples demonstrate the effect of these two factors on the compression set of the resultant polyurethane elastomers.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing a polyurethane elastomer having a compression set of less than 20%, comprising reacting:
   A) a polymethylene poly(phenylisocyanate) component or a prepolymer thereof, said isocyanate component having an NCO group content of 15 to 33%, an average functionality of 2.2 to 2.8, and containing at least about 10% by weight of 2,4'-diphenylmethane diisocyanate; and
   B) a polyol component having an average functionality of about 2.0 or less which comprises:
      1) from 60 to 95% by weight, based on 100% by weight of component B), of at least one isocyanate-reactive component containing hydroxyl groups, and having a molecular weight of more than 1,000, and a functionality of about 1.5 to about 2, and
      2) from 5 to 40% by weight, based on 100% by weight of component B), of at least one isocyanate-reactive component having a molecular weight of about 62 to 1,000 and a functionality of about 1.5 to 2;
   wherein the components are processed via the one-shot process at an isocyanate index of 90 to 130.

2. The process of claim 1, wherein the polymethylene poly(phenylisocyanate) or prepolymer thereof contains from about 10 to about 40% by weight of 2,4'-diphenylmethane diisocyanate.

3. The process of claim 1, wherein the polymethylene poly(phenylisocyanate) component or prepolymer thereof has a functionality of about 2.3 to about 2.8.

4. The process of claim 1, wherein the polymethylene poly(phenylisocyanate) component or prepolymer thereof contains from about 10% to about 30% by weight of 2,4'-diphenylmethane diisocyanate.

5. The process of claim 4, wherein the polymethylene poly(phenylisocyanate) component or prepolymer thereof contains from about 10% to about 25% by weight of 2,4'-diphenylmethane diisocyanate.

6. The process of claim 1, wherein component B) has an average functionality of about 2.0.

7. The process of claim 1, wherein component B)1) has a nominal functionality of about 2.

8. The process of claim 1, wherein component B)1) has a molecular weight of at least about 2,000.

9. The process of claim 8, wherein component B)1) has a molecular weight of about 3,000 to about 8,000.

10. The process of claim 1, wherein component B)2) has a nominal functionality of about 2.

11. The process of claim 1, wherein component B)2) has a molecular weight of about 90 to about 300.

12. The process of claim 1, wherein the resultant polyurethane elastomer has a compression set of about 12% or less.

13. The process of claim 12, wherein the resultant polyurethane elastomer has a compression set of about 10% or less.

14. The process of claim 1, wherein the polymethylene poly(phenylisocyanate) component comprises a prepolymer prepared by reacting (i) a polymethylene poly(phenylisocyanate) with (ii) an isocyanate-reactive component containing at least about two hydroxyl groups.

15. The process of claim 1, wherein the polymethylene poly(phenylisocyanate) component comprises a prepolymer prepared by blending (i) a prepolymer of diphenylmethane diisocyanate, with (ii) a polymethylene poly(phenylisocyanate) component.

16. A polyurethane elastomer having a compression set of less than 20%, and comprising the reaction product of:
   A) a polymethylene poly(phenylisocyanate) component or a prepolymer thereof, said isocyanate component having an NCO group content of 15 to 33%, an average functionality of 2.2 to 2.8, and containing at least about 10% by weight of 2,4'-diphenylmethane diisocyanate; and
   B) a polyol component having an average functionality of about 2.0 or less which comprises:
      1) from 60 to 95% by weight, based on 100% by weight of component B), of at least one isocyanate-reactive component containing hydroxyl groups, and having a molecular weight of more than 1,000, and a functionality of about 1.5 to about 2, and
      2) from 5 to 40% by weight, based on 100% by weight of component B), of at least one isocyanate-reactive component having a molecular weight of about 62 to about 1,000 and a functionality of about 1.5 to 2;
   wherein the components are processed via the one-shot process at an isocyanate index of 90 to 130.

17. The polyurethane elastomer of claim 16, wherein the polymethylene poly(phenylisocyanate) or prepolymer thereof contains from about 10 to about 40% by weight of 2,4'-diphenylmethane diisocyanate.

18. The polyurethane elastomer of claim 16, wherein the polymethylene poly(phenylisocyanate) component or prepolymer thereof has a functionality of about 2.3 to about 2.8.

19. The polyurethane elastomer of claim 16, wherein the polymethylene poly(phenylisocyanate) component or prepolymer thereof contains from about 10% to about 30% by weight of 2,4'-diphenylmethane diisocyanate.

20. The polyurethane elastomer of claim 19, wherein the polymethylene poly(phenylisocyanate) component or prepolymer thereof contains from about 10% to about 25% by weight of 2,4'-diphenylmethane diisocyanate.

21. The polyurethane elastomer of claim 16, wherein component B) has an average functionality of about 2.0.

22. The polyurethane elastomer of claim 16, wherein component B)1) has a nominal functionality of about 2.

23. The polyurethane elastomer of claim 16, wherein component B)1) has a molecular weight of at least about 2,000.

24. The polyurethane elastomer of claim 23, wherein component B)1) has a molecular weight of about 3,000 to about 8,000.

25. The polyurethane elastomer of claim 16, wherein component B)2) has a nominal functionality of about 2.

26. The polyurethane elastomer of claim 16, wherein component B)2) has a molecular weight of about 90 to about 300.

27. The polyurethane elastomer of claim 16, wherein the resultant polyurethane elastomer has a compression set of about 12% or less.

28. The polyurethane elastomer of claim 27, wherein the resultant polyurethane elastomer has a compression set of about 10% or less.

29. The polyurethane elastomer of claim 16, wherein the polymethylene poly(phenylisocyanate) component comprises a prepolymer prepared by reacting (i) a polymethylene poly(phenylisocyanate) with (ii) an isocyanate-reactive component containing at least about two hydroxyl groups.

30. The polyurethane elastomer of claim 16, wherein the polymethylene poly(phenylisocyanate) component comprises a prepolymer prepared by blending (i) a prepolymer of diphenylmethane diisocyanate, with (ii) a polymethylene poly(phenylisocyanate) component.

* * * * *